(12) United States Patent
Haimer

(10) Patent No.: US 11,602,794 B2
(45) Date of Patent: Mar. 14, 2023

(54) BALANCING ADAPTER FOR A BALANCING DEVICE, BALANCING DEVICE AND BALANCING ADAPTER SET

(71) Applicant: FRANZ HAIMER MASCHINENBAU KG, Igenhausen (DE)

(72) Inventor: Franz Haimer, Igenhausen (DE)

(73) Assignee: Franz Haimer Maschinenbau KG, Igenhausen (DE)

( * ) Notice: Subject to any disclaimer, the term of this patent is extended or adjusted under 35 U.S.C. 154(b) by 0 days.

(21) Appl. No.: 17/009,032

(22) Filed: Sep. 1, 2020

(65) Prior Publication Data
US 2021/0069800 A1    Mar. 11, 2021

(30) Foreign Application Priority Data

Sep. 11, 2019   (DE) .............................. 102019124418

(51) Int. Cl.
*B23B 31/40*   (2006.01)
*B23B 31/26*   (2006.01)

(52) U.S. Cl.
CPC ...... *B23B 31/4026* (2013.01); *B23B 31/4006* (2013.01); *B23B 31/263* (2013.01);
(Continued)

(58) Field of Classification Search
CPC ......... Y10T 279/1008; Y10T 279/3406; B23B 31/4006; B23B 31/4026; B23B 31/404;
(Continued)

(56) References Cited

U.S. PATENT DOCUMENTS 3,517,939 A * 6/1970 Jaehn .................. B23F 23/06
 279/2.03
7,303,186 B2 * 12/2007 Yonezawa ............. B23B 31/402
 269/309
(Continued)

FOREIGN PATENT DOCUMENTS

DE     1902401 A1 *  8/1969 ......... B23B 31/4033
DE     2227245 A1    1/1974
(Continued)

OTHER PUBLICATIONS

Machine Translation, Description of DE2227245A1. (Year: 1974).*

*Primary Examiner* — Eric A. Gates
(74) *Attorney, Agent, or Firm* — Laurence A. Greenberg; Werner H. Stemer; Ralph E. Locher

(57) ABSTRACT

A balancing adapter for a balancing device has a clamping device for clamping a workpiece. The clamping device has a clamping sleeve element with a clamping sleeve, and a clamping element that can be moved relative to the clamping sleeve element. The clamping sleeve has a taper, and the clamping element has a mating taper corresponding to the clamping sleeve taper. The clamping diameter of the clamping sleeve can be adjusted, and thus a workpiece can be clamped, by moving the clamping element relative to the clamping sleeve element. The clamping sleeve element is releasably connectable to a base body of the balancing adapter. Accordingly, for connection to the base body, the clamping sleeve element has an annular flange by which, in the connected state of the clamping sleeve element and the base body, the clamping sleeve element rests on an end wall of the base body.

19 Claims, 4 Drawing Sheets

(52) U.S. Cl.
CPC ....... *B23B 2231/04* (2013.01); *B23B 2250/04* (2013.01); *B23B 2260/022* (2013.01)

(58) Field of Classification Search
CPC .............. B23B 31/406; B23B 31/4033; B23B 31/4066; Y10S 279/901; B23Q 1/009; B23Q 3/06; B23Q 2703/06
See application file for complete search history.

(56) References Cited

U.S. PATENT DOCUMENTS

| | | |
|---|---|---|
| 9,180,527 B2 | 11/2015 | Haimer |
| 10,035,227 B2 * | 7/2018 | Kawakami ............. B23Q 1/009 |
| 2011/0233839 A1 | 9/2011 | Haimer |
| 2013/0239400 A1 * | 9/2013 | Yokoyama .............. F16H 15/38 29/558 |
| 2014/0353930 A1 * | 12/2014 | Haimer ................. B23B 31/208 279/2.11 |
| 2015/0123356 A1 | 5/2015 | Haimer et al. |
| 2016/0008894 A1 | 1/2016 | Derheim |
| 2017/0225238 A1 * | 8/2017 | Schlautmann ...... B23B 31/4013 |
| 2018/0229310 A1 * | 8/2018 | Miura ................... B23B 31/113 |

FOREIGN PATENT DOCUMENTS

| | | | |
|---|---|---|---|
| DE | 102007036144 A1 | 2/2009 | |
| JP | 58126005 A * | 7/1983 | ......... B23B 31/4066 |

\* cited by examiner

BALANCING ADAPTER FOR A BALANCING DEVICE, BALANCING DEVICE AND BALANCING ADAPTER SET

CROSS-REFERENCE TO RELATED APPLICATION

This application claims the priority, under 35 U.S.C. § 119, of German patent application DE 10 2019 124 418, filed Sep. 11, 2019; the prior application is herewith incorporated by reference in its entirety.

BACKGROUND OF THE INVENTION

Field of the Invention

The invention relates to a balancing adapter for a balancing device, to a balancing device having the balancing adapter, and to a balancing adapter set.

There are known balancing devices in which the balancing device has a fixed or stationary base station, on which exchangeable balancing adapters can be mounted. In this case, the balancing adapters can generally be secured on a base station drive spindle, which has a balancing adapter receptacle and is part of a driving device of the base station for the rotary driving of the balancing adapter. By means of the balancing adapters connected to the base station, workpieces to be balanced, e.g. milling tools, tool holders or belt pulleys, can be received or clamped. In the clamped state, the workpieces can then be balanced by means of the balancing device.

The exchangeable balancing adapters differ from one another primarily in that they have different clamping systems and clamping dimensions or clamping diameters for clamping workpieces. One particular type of workpiece can therefore be clamped by means of each balancing adapter. Milling tools and tool holders, for example, are generally clamped by means of a balancing adapter which allows clamping of a workpiece from the outside. In contrast, certain belt pulleys or grinding discs having a centrally arranged, cylindrical aperture are clamped by means of a balancing adapter which allows clamping of a workpiece from the inside. By means of the exchangeable balancing adapters, particularly simple adaptation of the balancing device to different workpieces to be clamped is made possible overall, as a result of which the balancing device is particularly versatile.

Published, non-prosecuted German patent application DE 10 2007 036 144 A1, corresponding to U.S. Pat. No. 9,180,527, discloses a balancing adapter for a balancing device which has a main body or base body and an interchangeable body that can be connected releasably to the main body. In one specific embodiment, the interchangeable body can have a clamping device for clamping a workpiece which contains a clamping sleeve element with a clamping sleeve and contains a clamping element that can be moved relative to the clamping sleeve element. The clamping sleeve has a taper, and the clamping element has a mating taper corresponding to the clamping sleeve taper. By moving the clamping element relative to the clamping sleeve element, the clamping diameter of the clamping sleeve can be adjusted by the action of the tapers, and a workpiece can thus be clamped. Here, the exchangeability of the interchangeable body allows adaptation of the balancing adapter to different workpieces to be clamped.

In the connected state, the main body and the interchangeable body are here furthermore held by rolling elements so as to be coaxial relative to one another and braced in a radial direction relative to one another. In this case, each of the rolling elements is arranged in a gap between the main body and the interchangeable body, which is configured as a wedge-shaped gap and matched to the respective rolling element in such a way that the respective rolling element can be moved along the wedge-shaped gap, deeper into the wedge-shaped gap, in such a way in the course of the interconnection of the main body and the interchangeable body that the desired bracing takes place in the radial direction. Such a connection between a main body and an interchangeable body is relatively complex.

BRIEF SUMMARY OF THE INVENTION

It is the object of the invention to provide a balancing adapter for a balancing device in which simple adaptation to different workpieces to be clamped is made possible with a particularly simple and functionally reliable balancing adapter construction.

This object is achieved by means of the features of the independent claims. Preferred developments are disclosed in the dependent claims.

Accordingly, a balancing adapter for a balancing device is proposed, having a clamping device for clamping a workpiece, wherein the clamping device has a clamping sleeve element with a clamping sleeve, and a clamping element, in particular a rod-shaped clamping element, that can be moved relative to the clamping sleeve element. In this case, the clamping sleeve has a taper, and the clamping element has a mating taper corresponding to the clamping sleeve taper. By moving the clamping element relative to the clamping sleeve element, the clamping diameter of the clamping sleeve can be adjusted, in particular, by the action of the tapers, and a workpiece can thus be clamped. Moreover, the clamping sleeve element, which, in particular, is configured as an interchangeable part, can be releasably connected to a base body of the balancing adapter. According to the invention, for connection to the base body, the clamping sleeve element has an annular flange by which, in the connected state of the clamping sleeve element and the base body, the clamping sleeve element rests, in particular in surface contact, on an end wall, in particular an outer and/or annular end wall, of the base body.

In this way, the balancing adapter has a particularly simple and functionally reliable construction since the clamping sleeve element now rests in a stably seated manner on the end wall of the base body in the connected state of the clamping sleeve element and the base body. By means of this bearing contact of the clamping sleeve element, particularly robust attachment of the clamping sleeve element to the base body with little susceptibility to damage is possible. Moreover, the clamping sleeve element can thereby also be connected to the base body and released from the base body in a manner which is particularly simple or involves little expenditure of force, thereby enabling the clamping sleeve element to be changed in a simple manner and the balancing adapter to be adapted to different workpieces to be clamped or balanced.

In a preferred embodiment of the balancing adapter according to the invention, the clamping sleeve element can be connected releasably to the base body by means of at least one connecting element, in particular at least one connecting element associated with the annular flange, in particular by means of a plurality of connecting screws. In this way, the clamping sleeve element and the base body can be connected to one another in a simple and reliable manner. In this case, the annular flange preferably has a plurality of through apertures, in particular holes, through which the connecting screws are passed. In this case, the apertures can be arranged in a manner distributed uniformly over the annular flange in the circumferential direction. The connecting screws are preferably screwed into corresponding threaded holes in the base body, in particular into corresponding threaded holes in a housing part of the base body.

As an alternative to the connecting screws, it would also be possible, for example, to connect the clamping sleeve element and the housing part releasably to one another by means of magnetic connecting elements or latching elements as connecting elements, attached to the annular flange and/or the base body.

The clamping sleeve element preferably has an aperture, in particular a through aperture, in which the rod-shaped clamping element is partially or completely accommodated, wherein, by virtue of the aperture, the clamping sleeve taper is configured as an internal taper. This enables a workpiece to be clamped in a simple and effective manner. The clamping element can expediently have a cylindrical portion, by means of which the clamping element is guided in a linearly movable manner in the aperture, in particular with the interposition of a guide element.

The clamping sleeve element preferably has a centring device for centring the clamping sleeve element, which is, in particular, substantially rotationally symmetrical, relative to the base body. This effectively ensures that the clamping sleeve element connected to the base body is always in the desired position or alignment relative to the base body.

For functionally reliable centring, the clamping sleeve element can have, as a centring device, a centring web, which projects into an interior space of the base body and rests, in particular in surface contact, against an inner wall of the base body. In this case, the centring web can expediently be of cylindrical design, in particular of circular-cylindrical design.

In a preferred specific embodiment, the clamping sleeve element and/or a sleeve-shaped base-body housing part connected to the clamping sleeve element can be of substantially rotationally symmetrical design.

For effective clamping of a workpiece, the clamping sleeve element can have a deposition surface, which surrounds the clamping sleeve on the outside, for a workpiece to be clamped, and/or for an adapter element, in particular a disc-shaped adapter element. A workpiece deposited on the deposition surface or the adapter element can be clamped, in particular from the inside, by means of the clamping device.

One expedient possibility is for the rod-shaped clamping element to be connected releasably in an end region to an actuating element, in particular a rod-shaped actuating element, of the balancing adapter for moving the clamping element relative to the clamping sleeve element.

It is preferable if the clamping element can be screwed in the end region to the actuating element to allow simple and rapid connection of the clamping element and the actuating element. To implement this screwed joint between the clamping element and the actuating element, the clamping element can have, in the end region, a plurality of mutually spaced grooves which extend over a partial circumference of the clamping element, in particular helically, and into which engagement elements, in particular balls, associated with the actuating element can be introduced.

In a preferred specific embodiment, the rod-shaped clamping element can be of multi-part design, wherein the clamping element has a rod-shaped base part and a connecting part, in particular a sleeve-shaped connecting part, which is connected to the base part and surrounds the base part in a ring shape, for connecting the clamping element to the actuating element.

The clamping sleeve element and the clamping element preferably form an interchangeable module which can be connected releasably to the base body of the balancing adapter. In this way, the clamping sleeve element and the clamping element can be connected to the base body in a particularly simple manner.

The balancing adapter preferably has a part of a driving device, in particular a pneumatically operated driving device, for the linear movement of the clamping element relative to the clamping sleeve element. More specifically, the balancing adapter can in this case have a piston of a piston-cylinder unit as a driving device, the piston being coupled directly or indirectly, in particular via a rod-shaped actuating element, to the clamping element.

In a preferred specific embodiment, the base body has a housing part, in particular a sleeve-shaped housing part, which surrounds the end wall, and an actuating module, which is connected to the housing part, in particular by means of a plurality of connecting screws, and has the actuating element and the part of the driving device.

In another embodiment, the clamping sleeve can be provided with slots distributed over the sleeve circumference, in particular through slots in the radial direction, for adjusting the clamping diameter. By means of slots of this kind, the clamping diameter of the clamping sleeve can be adjusted to the desired extent in a simple and effective manner. Provision is preferably made here for the clamping sleeve to be of closed design over the entire sleeve circumference in a free end region. Particularly simple clamping of a component from the inside is made possible in this way.

A balancing device having the balancing adapter according to the invention is furthermore also claimed.

The advantages obtained through the balancing device according to the invention are identical with the already acknowledged advantages of the balancing adapter according to the invention, and therefore they will not be repeated at this point.

The balancing device can expediently have a base station with a balancing adapter receptacle for receiving the balancing adapter. In this case, the base station preferably has a rotary driving device for the rotary driving of the balancing adapter received and/or has at least one part of a driving device for the movement, in particular linear movement, of the clamping element relative to the clamping sleeve element.

Moreover, a balancing adapter set is also claimed, having a plurality of clamping sleeve elements, at least one, in particular a plurality of, clamping element/s, in particular rod-shaped clamping element/s, corresponding to the clamping sleeve elements, and a base body. Each clamping sleeve element has a clamping sleeve, and the individual clamping sleeve elements differ from one another, at least in the configuration of the clamping sleeves thereof, in particular in the outside diameter of the clamping sleeves thereof. The clamping sleeve of each clamping sleeve element has a taper, and the at least one clamping element has a mating taper corresponding to the clamping sleeve taper. Each clamping sleeve element is releasably connectable to the base body, wherein, for connection to the base body, each clamping sleeve element has an annular flange by means of which, in the connected state of the clamping sleeve element and the base body, the clamping sleeve element rests, in particular in surface contact, on an end wall, in particular an outer and/or annular end wall, of the base body.

By means of the balancing adapter set according to the invention, a modular construction, by means of which the balancing adapter can be adapted in a simple manner to different workpieces to be clamped, is achieved.

Apart from the cases of clear dependency relationships or irreconcilable alternatives, for example, the advantageous embodiments and/or developments of the invention which are explained above and/or given in the dependent claims can be used individually or in any desired combination.

Other features which are considered as characteristic for the invention are set forth in the appended claims.

Although the invention is illustrated and described herein as embodied in a balancing adapter for a balancing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
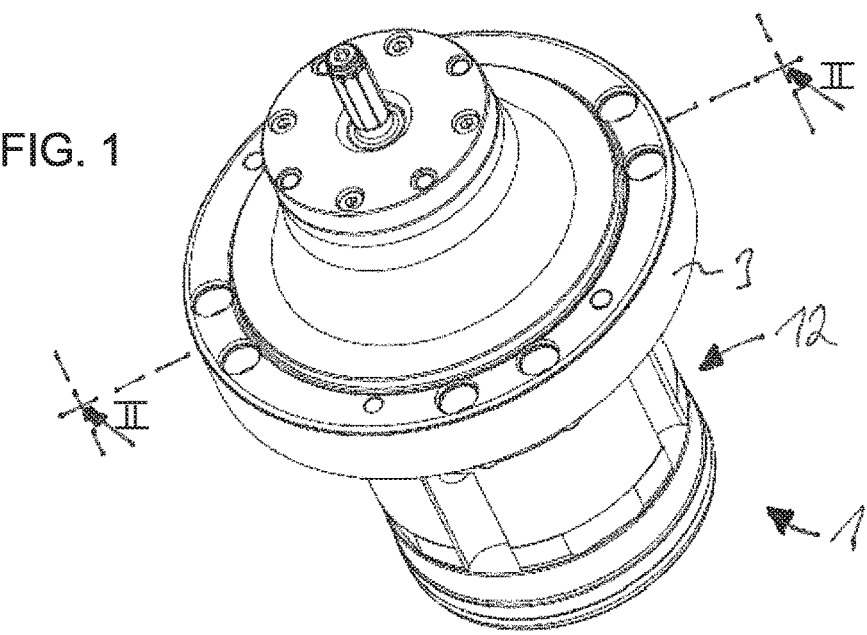
FIG. 1 is a diagrammatic, perspective view of a first illustrative embodiment of a balancing adapter according to the invention.

Referring now to the figures of the drawings in detail and first, particularly to FIG. 1 thereof, there is shown a first illustrative embodiment of a balancing adapter 1 according to the invention. The balancing adapter 1 has a connecting device 3, by means of which the balancing adapter 1 can be connected to a fixed base station 5, indicated by dashed lines in FIG. 2, or fixed on the base station 5. Together with the base station 5, the balancing adapter 1 forms a balancing device 7, by means of which workpieces can be balanced.

The base station 5 has a drive spindle 9, likewise indicated here by dashed lines, having a balancing adapter receptacle 11, in which the balancing adapter 1 can be arranged by means of a receiving region 12. The drive spindle 9 is part of a driving device (not shown more specifically here) of the base station 5 for rotary driving of the balancing adapter 1. To secure the balancing adapter 1 on the balancing device 7, the balancing adapter 1 is introduced by means of the receiving region 12 into the balancing adapter receptacle 11 until an outward-projecting annular flange 13 of the connecting device 3 is resting on the drive spindle 9. The balancing adapter 1 is then screwed to the drive spindle 9 by means of a plurality of connecting screws 14, wherein each connecting screw 14 is passed through a through aperture or hole in the annular flange 13 and screwed into a corresponding threaded hole in the drive spindle 9.

Figure 2:
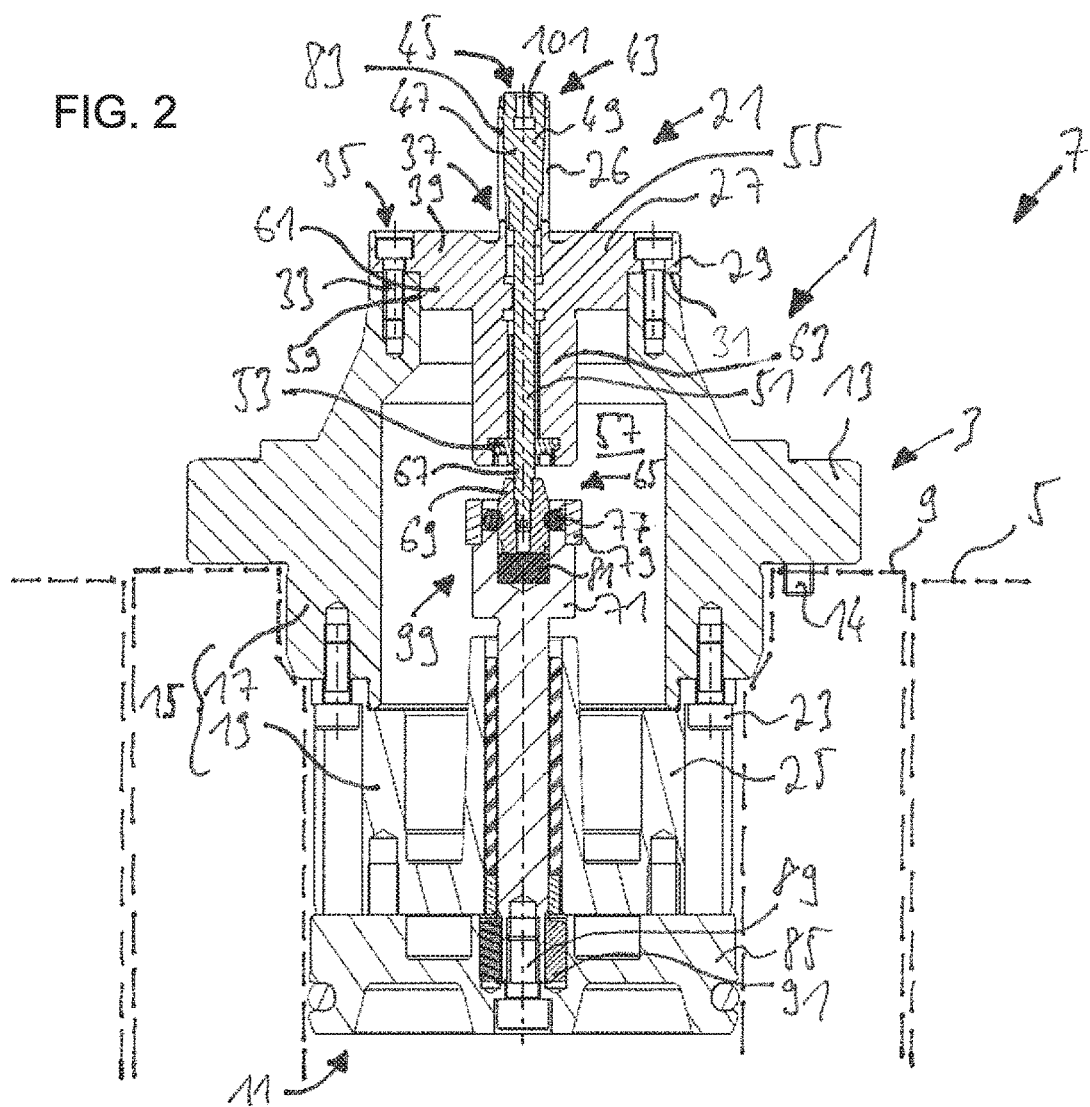
FIG. 2 is a sectional view taken along section plane II-II shown in FIG. 1.

As is furthermore apparent from FIG. 2, the balancing adapter 1 has a base body 15 having a sleeve-shaped housing part 17, here a substantially rotationally symmetrical housing part by way of example. The outward-projecting annular flange 13 of the connecting device 3 is formed on the housing part 17. Moreover, the base body 15 also has an actuating module 19, connected to the housing part 17, for actuating a clamping device 21 of the balancing adapter 1. By means of the clamping device 21, a workpiece to be balanced can be clamped on the balancing adapter 1. Here, the housing part 17 and the actuating module 19 are connected by means of a plurality of connecting screws 23. Here, each connecting screw 23 is passed through a through aperture or hole in a housing part 25 of the actuating module 19 and screwed into a corresponding threaded hole in the housing part 17 of the base body 15.

According to FIG. 2, the housing part 17 of the base body 15 is here furthermore releasably connected to a clamping sleeve element 27 of the clamping device 21, the element having a clamping sleeve 26. For this purpose, the clamping sleeve element 27 has an outward-projecting annular flange 29 by means of which, in the connected state of the clamping sleeve element 27 and the housing part 17, the clamping sleeve element 27 rests in surface contact on an outer annular end wall 31 of the housing part 17.

Here, by way of example, the clamping sleeve element 27 and the housing part 17 are connected by means of a plurality of connecting screws 33. Here, each connecting screw 33 is passed through a through aperture or hole in the annular flange 29 and screwed into a corresponding threaded hole in the housing part 17 of the base body 15. Here, by way of example, the through apertures of the annular flange 29 are arranged in a manner distributed uniformly over the circumference of the clamping sleeve element 27, which is here substantially rotationally symmetrical (FIG. 1). In the connected state of the clamping sleeve element 27 and the housing part 17, the screw heads of the connecting screws 33, which rest against the clamping sleeve element 27, are here furthermore received in a countersunk manner or completely in apertures or holes 35 in the clamping sleeve element 27.

Thus, to connect the clamping sleeve element 27 to the base body 15, the clamping sleeve element 27 is here first of all placed on the base body 15, with the result that the clamping sleeve element 27 rests by means of the annular flange 29 on the end wall 31 of the housing part 17. After this, the clamping sleeve element 27 and the housing part 17 are then connected to one another by means of the connecting screws 33. In this way, the clamping sleeve element 27 can be connected to the base body 15 in a simple and robust manner. At the same time, this type of releasable connection between the clamping sleeve element 27 and the base body 5 also reliably ensures that the balancing adapter 1 always has a high quality of balance when connecting the base body 15 to different clamping sleeve elements 27. Optionally, each connecting screw 33 could also be retained in the respective aperture of the annular flange 29 by a retaining ring, in particular by a snap ring, such that the connecting screws 33 cannot be removed from or fall out of the apertures when the connection between the clamping sleeve element 27 and the housing part 17 is released. In this way, a particularly high quality of balance of the balancing adapter 1 can be ensured.

As an alternative to the connecting screws 33, it would however also be possible, for example, to connect the clamping sleeve element 27 and the housing part 17 releasably to one another by means of magnetic connecting elements or latching elements as connecting elements attached to the annular flange 29 and/or the housing part 17.

Figure 3:
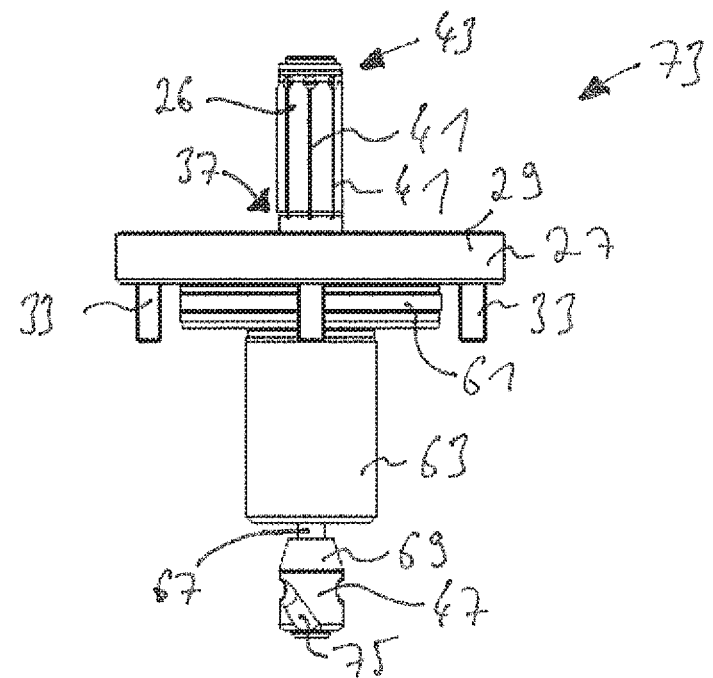
FIG. 3 is a side view of an interchangeable module of the balancing adapter.

As furthermore shown in FIG. 2, the clamping sleeve 26 of the clamping sleeve element 27 is connected by means of an end region 37 to a base region 39 of the clamping sleeve element 27, the region having the annular flange 29. In this case, the clamping sleeve 26 and the base region 39 are here of one-piece or integral design, by way of example. Moreover, the clamping sleeve 26 here has a plurality of slots 41 (FIG. 3) distributed uniformly over the sleeve circumference in a central region, by means of which slots the clamping diameter of the clamping sleeve 26 can be adjusted to the desired extent. At a free end 43, the clamping sleeve 26 is here furthermore of closed design, i.e. not slotted, over the entire sleeve circumference. Furthermore, the clamping sleeve 26 has an internal taper 83 with a cross section which decreases in the direction of the base region 39 and which here extends substantially over the entire length of the clamping sleeve 26.

According to FIG. 2, the clamping sleeve element 27 here furthermore has a through aperture 45, in which a clamping element 47, in this case a rod-shaped clamping element by way of example, is partially received. In this case, the through aperture 45 also forms the internal taper of the clamping sleeve 26. The rod-shaped clamping element 47 has a portion 49 with an external taper, by means of which the clamping element 47 is in contact or can be brought into contact with the clamping sleeve 26. Moreover, the clamping element 47 also has a cylindrical portion 51, by means of which the clamping element 47 is guided in a linearly movable manner, here with the interposition of a ball guide by way of example, in the aperture 45. In this case, the ball guide is here held captive in the aperture 45 by means of a holding ring 53 screwed into a threaded hole in the clamping sleeve element 27.

By moving the clamping element 47 arranged in the aperture 45 downwards relative to the clamping sleeve element 27 or in the direction of the housing part 25, the clamping sleeve 26 is forced open outwards under the action of the external taper of the clamping element 47 and the internal taper of the clamping sleeve 26, with the result that the clamping diameter of the clamping sleeve 26 increases. In this way, a workpiece placed on a deposition surface 55 of the clamping sleeve element 27 can be clamped from the inside. Here, the deposition surface 55 surrounds the clamping sleeve 26 on the outside in the form of a ring.

For clamping, it would alternatively also be possible for a workpiece to be deposited on an adapter element (not shown in the figures), in particular a disc-shaped adapter element, resting on the deposition surface 55.

To release a clamped tool, the clamping element 47 is moved in the opposite direction or upwards relative to the clamping sleeve element 27, with the result that the clamping diameter of the clamping sleeve 26 decreases.

Moreover, here too, the clamping sleeve element 27 has a centring device for centring the clamping sleeve element 27 relative to the base body 15. Here, the centring device is formed by a centring web 61 of the base region 39 of the clamping sleeve element 27, the web projecting into an interior space 57 of the base body housing part 17 and resting against an inner wall 59 of the housing part 17. As an option, a guide element, in particular a ball guide, by means of which the clamping sleeve element 27 is guided in a linearly movable manner relative to the housing part 17 in the state in which the connecting screws 33 are unscrewed, could be arranged between the centring web 61 and the housing part 17. Here too, the base region 39 furthermore has a guide region 63, which projects from the centring web 61 and likewise projects into the interior space 57 of the housing part 17 and in which the clamping element 47 is guided in a linearly movable manner.

As is furthermore shown in FIG. 2, the rod-shaped clamping element 47 projects by means of an end region 65 from the clamping sleeve element 27. Here, moreover, the clamping element 47 is of two-part design. In this case, the clamping element 47 has a rod-shaped base part 67 and a sleeve-shaped connecting part 69, which is connected in the projecting end region 65 to the base part 67 and surrounds the base part 67 in a ring shape. By means of the connecting part 69, the clamping element 47 can be connected releasably to an actuating element 71 of the actuating module 19, the actuating element being rod-shaped here by way of example. For connection to the rod-shaped base part 67, the sleeve-shaped connecting part 69 has an internal thread, by means of which the connecting part 69 can be screwed onto the base part 67, which has a corresponding external thread. In this case, the clamping sleeve element 27 and the clamping element 47 here form an interchangeable module 73 (FIG. 3), which can be connected releasably to the base body 15 of the balancing adapter 1 by means of the connecting screws 33.

For the releasable connection of the clamping element 47 and the actuating element 71, it is possible here for the clamping element 47 to be screwed to the actuating element 71. For this purpose, the sleeve-shaped connecting part 69 has a plurality of mutually spaced grooves 75 (FIG. 3) which extend helically in some region or regions over a partial circumference of the connecting part 69 and into which balls 77 as engagement elements with a matching contour held on an end region 99 of the rod-shaped actuating element 71 can be introduced. The balls 77 are arranged in through apertures as ball receptacles of the actuating element 71, wherein the balls 77 project inwards by means of a partial region into a clamping element receiving space of the actuating element 71. Moreover, the balls 77 are retained in the apertures by means of a press-fitted holding ring 79 (FIG. 2).

For screwing the rod-shaped clamping element 47 to the actuating element 71, the clamping element 47 here has a driving profile 101 arranged at the end, in this case an internal hexagon by way of example. When the clamping element 47 is screwed to the actuating element 71, the clamping element 47 furthermore comes to rest by means of the opposite end face against a spring element 81, in this case manufactured from rubber by way of example, arranged in the clamping element receiving space of the actuating element 71.

Moreover, the rod-shaped actuating element 71 is here connected for conjoint rotation, by means of the other end region, to a piston 85 of the actuating module 19. The piston 85 is part of a compressed air-operated cylinder-piston unit of the balancing device 7, which forms a driving device or actuator for the linear movement of the actuating element 71 and thus also of the clamping element 47, coupled to the latter, of the balancing adapter 1. The other components of this driving device are part of the base station 5 of the balancing device 7. Compression springs (not shown in the figures) are here furthermore arranged between the piston 85 and the housing part 25 of the actuating module 19, the springs bringing about a downward axial preload on the piston 85 away from the housing part 25.

More specifically, the actuating element 71 is here connected to the piston 85 by means of a screwed joint, wherein a screw 89 is passed through an axial through aperture of the piston 85 and screwed into a threaded hole in the end of the actuating element 71. In this case, the end region of the actuating element 71 has circumferential apertures in which cylindrical pins 91 of the piston 85 engage with a matching contour, thus preventing rotation of the actuating element 71 relative to the piston 85.

Moreover, the rod-shaped actuating element 71 can be moved linearly between an initial position and an end position by means of the piston 85. Here, the actuating element 81 is arranged in the end position in FIG. 2. In the initial position, the actuating element 85 is shifted downwards in comparison with the end position. Movement of the actuating element 71 causes concomitant movement of the clamping element 47 coupled to the actuating element 71 and thus movement of the clamping element 47 relative to the clamping sleeve element 27.

Figure 4:
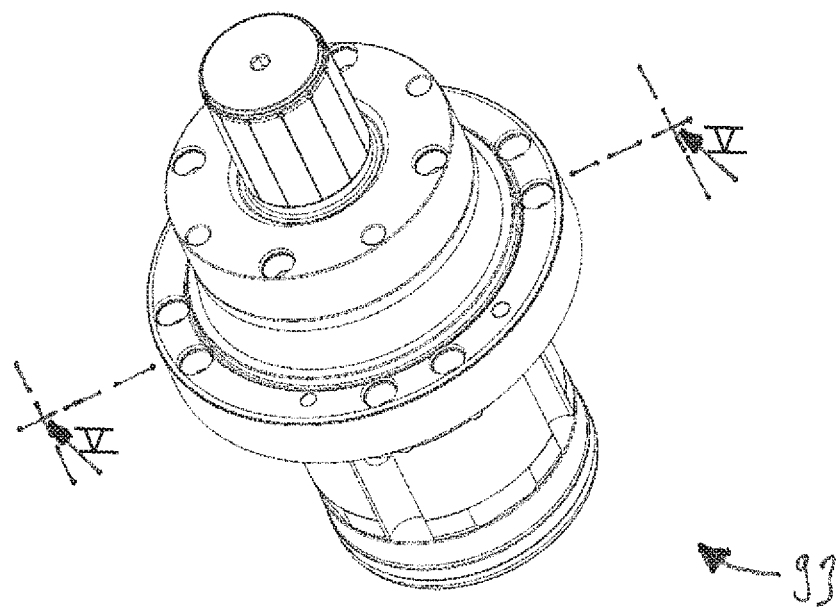
FIG. 4 is a perspective view of a second illustrative embodiment of the balancing adapter according to the invention.
Figure 5:
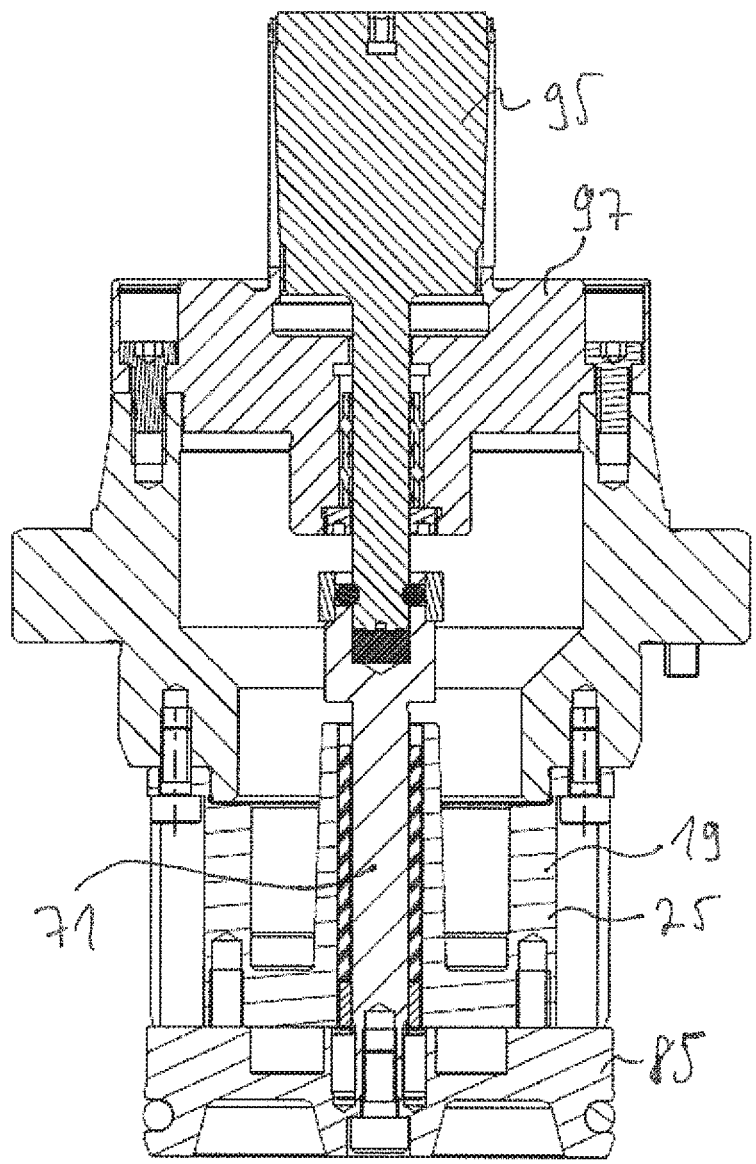
FIG. 5 is a sectional view taken along section plane V-V shown in FIG. 4.

A second embodiment of a balancing adapter 93 according to the invention is shown in FIGS. 4 and 5. In comparison with the balancing adapter 1 shown in FIGS. 1 to 3, the balancing adapter 93 has a clamping element 95 and a clamping sleeve element 97. The clamping sleeve element 97 has a clamping sleeve with a sleeve diameter which is larger than the clamping sleeve 26. Here too, therefore, the externally tapered portion of the rod-shaped clamping element 95 has a larger diameter. Here, furthermore, the clamping element 95 does not have a separate connecting part for connection to the actuating element 71. Here, the clamping element 95 is of one-piece design instead.

Figure 6:
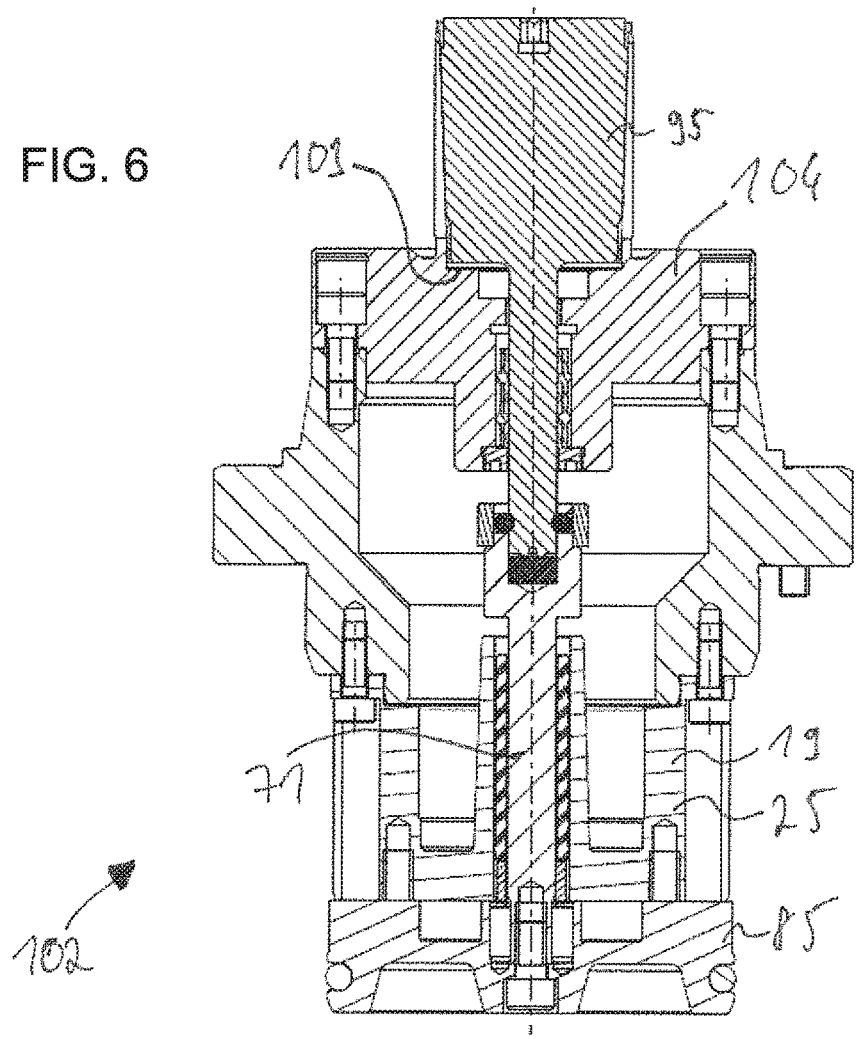
FIG. 6 is a sectional view of a third illustrative embodiment of the balancing adapter according to the invention FIG. 5.

A third embodiment of a balancing adapter 102 according to the invention is shown in FIG. 6. In comparison with the balancing adapter 93 shown in FIGS. 4 and 5, the balancing adapter 102 has a clamping sleeve element 104. The clamping sleeve element 104 has a stop surface 103 as a stop for the clamping element 95. This stop surface 103 limits the downward clamping travel of the clamping element 95, thus effectively counteracting excessive expansion of the clamping sleeve 26. In this case, the stop surface 103 is formed by an inward-projecting annular shoulder of the clamping sleeve element 104.

Figure 7:
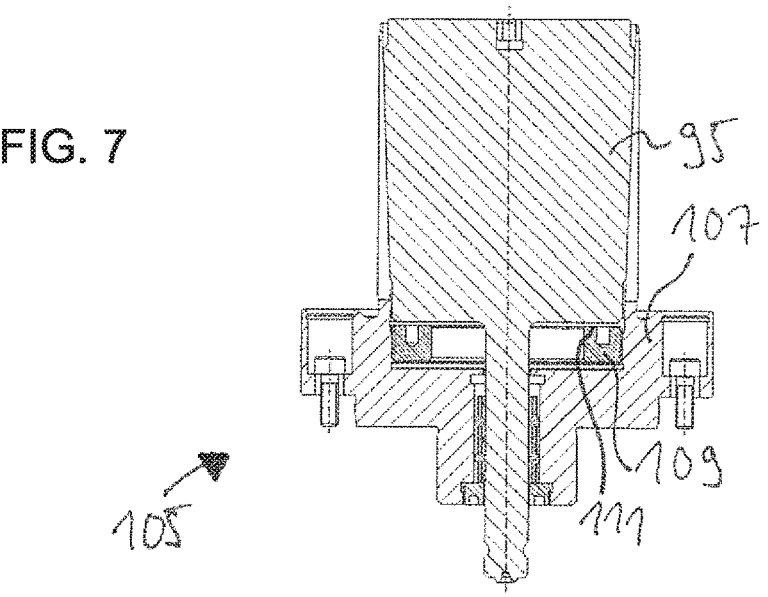
FIG. 7 is a sectional view of a fourth illustrative embodiment of the balancing adapter according to the invention.

A part of a fourth embodiment of a balancing adapter 105 according to the invention is shown in FIG. 7. In comparison with the balancing adapter 93 shown in FIGS. 4 and 5, the balancing adapter 105 has a clamping sleeve element 107. The clamping sleeve element 107 has a stop ring 109, which is screwed into a threaded hole and the end surface of which here forms a stop surface 111 for the clamping element 95. The stop ring 109 surrounds a portion of the clamping element 95 in a ring shape and, by way of example, here has a plurality of apertures, in particular holes, distributed in the circumferential direction for screw actuation of the clamping element 95 by means of a suitable actuating element. By screwing the stop ring 109 further into the threaded hole or by unscrewing the stop ring 109 from the threaded hole, it is possible in this case to adjust the limitation of the downward clamping travel of the clamping element 95 or to adjust the maximum expansion of the clamping sleeve 26. This can be used, for example, to adjust or limit the clamping pressure in the case of pressure-sensitive workpieces. As an option, it would furthermore be possible here to screw a retaining element, in particular a locknut, into the threaded hole in order to hold the stop ring 109 reliably in the desired position.

The following is a summary list of reference numerals and the corresponding structure used in the above description of the invention:

| | | | |
|---|---|---|---|
| 1 | balancing adapter | 35 | aperture |
| 3 | connecting device | 37 | end region |
| 5 | base station | 39 | base region |
| 7 | balancing device | 41 | slot |
| 9 | drive spindle | 43 | end region |
| 11 | balancing adapter receptacle | 45 | aperture |
| 12 | receiving region | 47 | clamping element |
| 13 | annular flange | 49 | portion |
| 14 | connecting screw | 51 | portion |
| 15 | base body | 53 | holding ring |
| 17 | housing part | 55 | deposition surface |
| 19 | actuating module | 57 | interior space |
| 21 | clamping device | 59 | inner wall |
| 23 | connecting screws | 61 | centring web |
| 25 | housing part | 63 | guiding region |
| 26 | clamping sleeve | 65 | end region |
| 27 | clamping sleeve element | 67 | base part |
| 29 | annular flange | 69 | connecting part |
| 31 | end wall | 71 | actuating element |
| 33 | connecting screws | 73 | interchangeable module |
| 75 | groove | | |
| 77 | ball | | |
| 79 | holding ring | | |
| 81 | spring element | | |
| 83 | internal taper | | |
| 85 | piston | | |
| 89 | screw | | |
| 91 | pin | | |
| 93 | balancing adapter | | |
| 95 | clamping element | | |
| 97 | clamping sleeve element | | |
| 99 | end region | | |
| 101 | driving profile | | |
| 102 | balancing adapter | | |
| 103 | stop surface | | |
| 104 | clamping sleeve element | | |
| 105 | balancing adapter | | |
| 107 | clamping sleeve element | | |
| 109 | stop ring | | |
| 111 | stop surface | | |

The invention claimed is:

1. A balancing adapter for a balancing device, the balancing adapter comprising:
   a base body having an end wall;
   a clamping device for clamping a workpiece, said clamping device having a clamping sleeve element with a clamping sleeve, and a clamping element that can be moved relative to said clamping sleeve element, said clamping sleeve element having a deposition surface, surrounding said clamping sleeve on an outside, for the workpiece to be clamped, or an adapter element, wherein the workpiece deposited on said deposition surface or said adapter element being clamped by means of said clamping device and bearing its weight on said deposition surface or said adapter element, wherein said clamping sleeve element and said clamping sleeve are formed as a one-piece part and said deposition surface being an exposed or free surface of said one-piece part;
   said clamping sleeve having a clamping sleeve taper;
   said clamping element having a mating taper corresponding to said clamping sleeve taper;
   a clamping diameter of said clamping sleeve can be adjusted, and thus the workpiece can be clamped, by moving said clamping element relative to said clamping sleeve element; and said clamping sleeve element being releasably connectable to said base body, and for a connection to said base body, said clamping sleeve element having an annular flange by means of which, in a connected state of said clamping sleeve element and said base body, said clamping sleeve element rests on said end wall of said base body.

2. The balancing adapter according to claim 1, further comprising at least one connecting element, said clamping sleeve element is releasably connectable to said base body by means of said at least one connecting element.

3. The balancing adapter according to claim 2, wherein:
said at least one connecting element is formed from a plurality of connecting screws; and
said annular flange has a plurality of through apertures formed therein through which said plurality of connecting screws are passed.

4. The balancing adapter according to claim 1, wherein said clamping sleeve element has an aperture formed therein, in which said clamping element is partially or completely accommodated, said aperture forms said clamping sleeve taper as an internal taper.

5. The balancing adapter according to claim 4, wherein:
said aperture is a through aperture; and
said clamping element has a cylindrical portion, by means of which said clamping element is guided in a linearly movable manner in said aperture.

6. The balancing adapter according to claim 1, wherein said clamping sleeve element has a centring device to centring said clamping sleeve element.

7. The balancing adapter according to claim 6, wherein said centring device has a centring web which projects into an interior space of said base body and rests against an inner wall of said base body.

8. The balancing adapter according to claim 1,
further comprising an actuating element; and
said clamping element is a rod-shaped clamping element, said rod-shaped clamping element is connected releasably in an end region to said actuating element for moving said clamping element relative to said clamping sleeve element.

9. The balancing adapter according to claim 8, wherein said clamping element can be screwed in said end region to said actuating element.

10. The balancing adapter according to claim 8, wherein said rod-shaped clamping element is of multi-part design, wherein said rod-shaped clamping element has a rod-shaped base part and a connecting part which is connected to said rod-shaped base part and surrounds said rod-shaped base part in a ring shape, for connecting said clamping element to said actuating element.

11. The balancing adapter according to claim 8, wherein said actuating element is a rod-shaped actuating element.

12. The balancing adapter according to claim 1, wherein said clamping sleeve element and said clamping element form an interchangeable module, which is releasably connectable to said base body of said balancing adapter.

13. The balancing adapter according to claim 1, wherein the balancing adapter has a part of a driving device for a linear movement of said clamping element relative to said clamping sleeve element.

14. The balancing adapter according to claim 13, wherein said base body has a housing part which surrounds said end wall, and an actuating module, which is connected to said housing part, and has an actuating element for moving said clamping element relative to said clamping sleeve element and/or said part of said driving device.

15. The balancing adapter according to claim 1, wherein said clamping sleeve has slots formed therein and distributed over a sleeve circumference for adjusting a clamping diameter.

16. The balancing adapter according to claim 1, wherein:
said clamping element is a rod-shaped clamping element;
said clamping sleeve element rests in surface contact, on said end wall; and
said end wall is an annular end wall.

17. The balancing adapter according to claim 1, wherein said clamping sleeve element has a centring device to centring said clamping sleeve element, which is substantially rotationally symmetrical, relative to said base body.

18. A balancing device, comprising:
a balancing adapter according to claim 1; and
a base station with a balancing adapter receptacle for receiving said balancing adapter, said base station further having a rotary driving device for rotary driving of said balancing adapter received and/or to have at least one part of a driving device for a movement of said clamping sleeve element relative to said clamping element.

19. A balancing adapter set, comprising:
a balancing adapter according to claim 1, wherein said clamping sleeve element is one of a plurality of clamping sleeve elements, said clamping element corresponding to said clamping sleeve elements;
wherein each of said clamping sleeve elements having said clamping sleeve, and said clamping sleeve elements differ from one another, at least in a configuration of said clamping sleeve;
wherein said clamping sleeve of each of said clamping sleeve elements having said clamping sleeve taper, and at least one said clamping element having the mating taper corresponding to the clamping sleeve taper; and
wherein each of said clamping sleeve elements is releasably connectable to said base body, wherein, for connection to said base body, each of said clamping sleeve elements has said annular flange by means of which, in the connected state of said clamping sleeve elements and said base body, said clamping sleeve elements rest on said end wall of said base body.

* * * * *